(12) United States Patent
Agarwal

(10) Patent No.: US 6,833,073 B2
(45) Date of Patent: Dec. 21, 2004

(54) COMPOSITE NANOFILTRATION AND REVERSE OSMOSIS MEMBRANES AND METHOD FOR PRODUCING THE SAME

(75) Inventor: Ashok K. Agarwal, Westlake Village, CA (US)

(73) Assignee: PTI Advanced Filtration, Inc., Oxnard, CA (US)

( * ) Notice: Subject to any disclaimer, the term of this patent is extended or adjusted under 35 U.S.C. 154(b) by 288 days.

(21) Appl. No.: 09/974,637

(22) Filed: Oct. 9, 2001

(65) Prior Publication Data

US 2003/0066796 A1 Apr. 10, 2003

(51) Int. Cl.[7] .......................... B01D 39/14; B01D 61/00
(52) U.S. Cl. .......................... 210/500.38; 210/500.21; 210/652; 210/490; 264/41; 427/244; 427/245
(58) Field of Search ..................... 210/500.37, 500.38, 210/500.21, 650–654, 490; 427/244, 245; 264/41

(56) References Cited

U.S. PATENT DOCUMENTS

| | | |
|---|---|---|
| 4,277,344 A | 7/1981 | Cadotte |
| 4,772,394 A | 9/1988 | Swedo et al. |
| 4,830,885 A | 5/1989 | Tran et al. |
| 4,885,091 A | 12/1989 | Swedo et al. |
| 4,983,291 A * | 1/1991 | Chau et al. .................. 210/490 |
| 5,246,587 A | 9/1993 | Tomaschke |
| 5,658,460 A | 8/1997 | Cadotte et al. |
| 5,693,227 A | 12/1997 | Costa |
| 6,177,011 B1 | 1/2001 | Hachisuka et al. |
| 6,183,640 B1 | 2/2001 | Wang |
| 6,245,234 B1 | 6/2001 | Koo et al. |

* cited by examiner

*Primary Examiner*—W. L. Walker
*Assistant Examiner*—Krishnan S Menon
(74) *Attorney, Agent, or Firm*—Oblon, Spivak, McClelland, Maier & Neustadt, P.C.

(57) ABSTRACT

The present invention relates to nanofiltration and reverse osmosis membranes that may be used in a number of commercial applications in which a contaminant, such as salt, must be separated from a feed fluid, such as brackish water, to yield a purified product fluid, as well as a method for manufacturing such membranes. According to embodiments of the invention, an aqueous amine solution including an amine, an organic acid (e.g., propionic acid) and a non-amine base is applied to the surface of a porous substrate. A second solution containing an acyl halide and an organic solvent immiscible in water is then applied to the aqueous amine solution to cause interfacial polymerization to occur. The resulting membranes exhibit superior salt rejection and flux properties.

16 Claims, No Drawings

COMPOSITE NANOFILTRATION AND REVERSE OSMOSIS MEMBRANES AND METHOD FOR PRODUCING THE SAME

BACKGROUND

Filtration membranes are commonly used to separate fluid mixtures and solutions. For example, reverse osmosis (RO) and nanofiltration (NF) membranes are commonly used to remove salts, minerals and other dissolved ions in the desalination of seawater or brackish water, the production of dairy products, recovery of paint solids and other substances in metal finishing applications, and the like. Typical operating pressures for RO filtration systems range from 200–1200 psi. Similarly, the typical operating pressure range for NF systems is 75–150 psi.

Such membranes may be produced by coating a support material with layer of an aqueous casting solution and contacting a second solution layer to the aqueous casting solution layer to cause interfacial polymerization.

U.S. Pat. No. 4,277,344 to Cadotte (the "Cadotte reference") describes an aromatic polyamide membrane produced by the interfacial reaction of an aromatic polyamine with at least two primary amine substituents and an acyl halide having at least three acyl halide substituents. A porous support is coated with a layer of aqueous solution containing a monomeric aromatic polyamine reactant. The coated support is then contacted with a solution containing an amine-reactive polyfunctional acyl halide (preferably dissolved in a nonpolar organic liquid) and then dried. The Cadotte reference describes the use of trichlorotrifluoroethane (commonly known by the trade name "FREON") as the organic solvent.

However, due to its environmentally adverse characteristics, FREON is no longer commercially available for this purpose. Using substitute solvents or alternative processes for making the membrane (such as contacting the polyamine reactant to the polyacyl halide in the vapor phase) produced membranes with inferior flux and salt rejection properties. The substitute solvents that have been tried to date are generally characterized by higher boiling points and low vapor pressures. Therefore, use of such solvents requires that the membranes be dried at higher temperatures, causing the membranes to lose the desirable flux and rejection characteristics.

U.S. Pat. No. 5,246,587 to Tomaschke describes an aromatic polyamide RO membrane that is made by first coating a porous support material with an aqueous solution containing a polyamine reactant and an amine salt. Examples of suitable polyamine reactants provided include aromatic primary diamines (such as, m-phenylenediamine or p-phenylenediamine or substituted derivatives thereof wherein the substituent is an alkyl group, an alkoxy group, a hydroxy alkyl group, a hydroxy group or a halogen atom); aromatic secondary diamines (such as, N,N'-diphenylethylene diamine), cycloaliphatic primary diamines (such as, cyclohexane diamine); cycloaliphatic secondary diamines (such as, piperazine or trimethylene dipiperidine); and xylene diamines (such as m-xylene diamine). The support material is typically made of a polyarylether sulfone, such as a polysulfone and a polyether sulfone; a polyimide; or a polyvinylidene fluoride. The layer of aqueous amine solution is then contacted with an organic solvent solution containing a monomeric, aromatic, amine-reactive reactant, causing interfacial polymerization. The product is then dried to form a water permeable membrane.

U.S. Pat. No. 6,245,234 to Koo et al. describes a composite polyamide RO membrane that is made by first coating a porous polysulfone support with an aqueous solution containing: 1) a polyfunctional primary or secondary amine; 2) a polyfunctional tertiary amine; and 3) a polar solvent. The excess aqueous solution is removed and the coated support is then dipped in an organic solvent solution of trimesoyl chloride (TMC) and a mixture of alkanes having from eight to twelve carbon atoms. The resulting composite membrane is then rinsed in a 0.2% sodium carbonate ($Na_2CO_3$) aqueous solution.

U.S. Pat. No. 6,177,011 to Hachisuka et al. describes a RO membrane comprising a sponge layer and a separation layer formed on the sponge layer. The separation layer either contains or is coated with an electrically-neutral organic substance or polymer, such that the surface zeta potential of the layer is with +/−0.10 millivolts at pH 6.

U.S. Pat. No. 6,183,640 to Wang describes a polymeric membrane having permanent, internal anionic charges. The membrane is cast on a porous support structure from a solution containing a sulfone polymer, an anionic charge-modifying agent, a nonsolvent and a solvent.

However, none of these membranes has the superior flux and salt rejection characteristics of the present invention. Additionally, several of the processes for membrane manufacturing described above consume large quantities of expensive chemicals, making the end product unaffordable in many popular commercial applications.

DETAILED DESCRIPTION

Embodiments of the present invention are directed to methods of manufacturing a filtration membrane, such as a RO or NF membrane, with high fluid flux and salt rejection properties, as well as to membranes produced by such methods. Membranes according to embodiments of the present invention may be made by depositing an aqueous amine solution containing propionic acid and a non-amine base on a microporous substrate. The aqueous amine solution may then be contacted with a second solution containing an acyl halide and an organic solvent to cause interfacial polymerization to occur between the two solution layers. The aqueous amine solution may be produced using a propionate salt.

Filtration membranes made according to method embodiments of the present invention may be cast upon a microporous substrate. The substrate may be prepared by casting a solution containing the substrate material on a non-woven polyester fabric or other backing material. In a particular embodiment, the substrate may be made of polysulfone. A casting solution may be prepared by dissolving polysulfone polymer pellets (e.g., Udel-3500 available from BP Amoco Chemicals, Inc. of Alpharetta, Ga.) in a solvent, such as dimethyl formamide. A suitable polysulfone substrate is the AS-100 ultrafilter available from PTI Advanced Filtration, Inc. of Oxnard, Calif. The casting solution may be applied to the backing material and may be gelled into a solid polysulfone substrate by dipping into a water bath. Alternative substrate materials may be used and the selection of a particular substrate material may depend on many factors (e.g., chemical environment involved in the commercial application of the membrane, etc.)

An aqueous amine solution is made by mixing an organic acid, such as propionic acid, into water. The solution is at least partially neutralized by the addition of a non-amine base (i.e., the pH of the solution may be raised). Sodium hydroxide has been found to be a suitable and cost-effective base for this purpose, although other bases may also be used. In an alternative embodiment of the present invention, the aqueous amine solution may be prepared directly from a salt, such as sodium propionate, rather than indirectly from an acid and a non-amine base. An amine such as piperazine powder, if a NF membrane is being produced, or m-poly (phenylenediamine) (MPD), if a RO membrane is being produced, is mixed into this solution and dissolved. The selection of a particular amine component of the aqueous amine solution may vary depending upon the type of membrane being produced. The substrate is then wetted with the aqueous amine solution. Any excess solution may be removed from the surface of the substrate, e.g., by evaporation or by blowing air over the surface of the substrate.

The wetted substrate may then be brought into contact with an acyl halide solution that contains a small quantity of an acyl halide, such as, trimesoyl chloride (TMC), cyclohexane-1,3,5-tricarbonyl chloride, isophthaloylchloride, and tetraphthaloyl chloride. The acyl halide may be dissolved in naphtha or a similar organic solvent. The solvent is preferable one that is immiscible in water, does not react with acyl halides and is chemically compatible with the selected substrate material. It is also preferable that use of the chosen solvent does not pose a fire hazard and that the solvent can be easily removed from the membrane during a drying process within an optimal temperature range. When the second solution is applied to the wetted substrate, interfacial polymerization instantaneously occurs, creating a thin-film polymeric membrane on the surface of the substrate. The excess quantity of the acyl halide solution may be removed by air-drying or by drying the membrane in an oven at high temperature. The latter may be preferred for naphtha or other organic solvents that generally have higher boiling points.

A NF membrane thus prepared may be continuously rolled and stored in dry condition. Such membranes typically exhibit 98–99.5% magnesium sulfate (MgSO$_4$) rejection for a 2000 ppm aqueous MgSO$_4$ solution at 100 psi and 77° F. The membranes also exhibited fluxes of 70–100 gallons/ft$^2$·day (gfd). Comparatively, membranes currently on the market demonstrate fluxes within the range of 25–40 gfd with 96–98% rejection under the identical operating conditions. The higher flux membranes of the present invention are advantageous insofar as they allow for higher throughput of product fluid and thus use much less energy to achieve the same output as compared to other commercially available membranes in its class.

In applying the aqueous amine solution and the acyl halide solution, it is important that the layers be applied evenly to ensure consistent polymerization across the surface of the membrane. The thickness of the applied layers is generally not crucial, so long as the correct molar quantities of each of the reactants in the solutions are provided so that polymerization can take place at the interface optimally. The use of an interfacial polymerization process will produce a polymeric layer with high molecular weight. High molecular weight polymers are preferred both for their higher mechanical strength as well as for their superior rejection properties.

While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all aspects as illustrative and not restrictive, the scope of the invention being indicated by the appended claims rather than the foregoing description. All changes that come within the meaning and range of equivalency of the claims are intended to be embraced therein.

What is claimed is:

1. A filtration membrane for separating a contaminant from a feed fluid to produce a product fluid, said membrane comprising:

a porous substrate having a first surface; and a product fluid-permeable layer cast on said first surface of said porous substrate, said layer comprising the interfacial polymerization reaction product of an aqueous amine solution and an acyl halide solution, wherein said aqueous amine solution is prepared from a propionic salt, an amine, and water, and said acyl halide solution includes an acyl halide and an organic solvents, and wherein the filtration membrane exhibits about 98% to 99.5% magnesium sulfate rejection and fluid fluxes of about 70 to 100 gallons/ft$^2$ per day for an aqueous magnesium sulfate solution at about 2000 ppm at about 100 psi and about 77° Fahrenheit.

2. The filtration membrane according to claim 1, wherein said layer has pores of a size suitable for nanofiltration.

3. The filtration membrane according to claim 1, wherein said layer has pores of a size suitable for reverse osmosis filtration.

4. The filtration membrane according to claim 1, wherein said amine is one of piperazine and m-poly (phenylenediamine).

5. The filtration membrane according to claim 1, wherein said acyl halide is selected from the group consisting of trimesoyl chloride, cyclohexane-1,3,5-tricarbonyl chloride, isophthaloylchloride, and tetraphthaloyl chloride.

6. The filtration membrane according to claim 1, wherein said organic solvent is immiscible in water.

7. The filtration membrane according to claim 6, wherein said organic solvent is naphtha.

8. The filtration membrane according to claim 1, wherein said porous substrate is comprised of polysulfone.

9. The filtration membrane of claim 1, wherein the aqueous amine solution is prepared by first mixing the propionic salt with the water and then adding the amine.

10. A method for producing a filtration membrane, the method comprising:

mixing a proprionic salt, an amine, and water to prepare an aqueous amine solution, applying the aqueous amine solution to a surface of a porous substrate to prepare a wetted substrate, and contacting the wetted substrate along an interface with an acyl halide solution including an acyl halide and an organic solvent, wherein polymerization occurs at the interface;

wherein the filtration membrane exhibits about 98% to 99.5% magnesium sulfate rejection and fluid fluxes of about 70 to 100 gallons/ft$^2$ per day for an aqueous magnesium sulfate solution at about 2000 ppm at about 100 psi and about 770° Fahrenheit.

11. The method according to claim 10, wherein the amine is one of piperazine and m-poly(phenylenediamine).

12. The method according to claim 10, wherein the acyl halide is trimesoyl chloride.

13. The method according to claim 10, wherein the organic solvent is naphtha.

14. The method according to claim 10, wherein the porous substrate is comprised of polysulfone.

15. The method according to claim 10, further including drying said membrane after said polymerization has occurred.

16. The method according to claim 10, wherein the propionic salt is mixed with the water prior to mixing in the amine.

* * * * *